Figure 1:
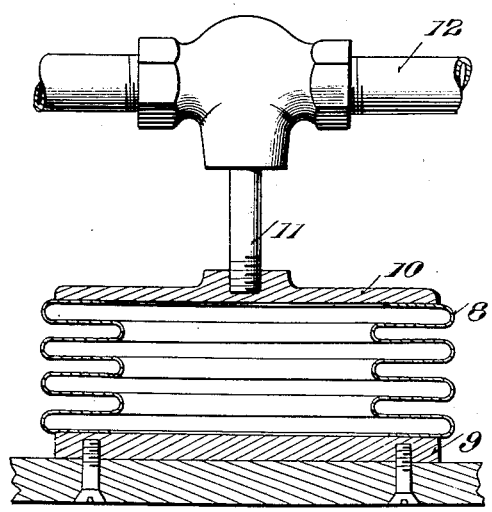

W. M. FULTON.
METHOD OF MAKING COLLAPSIBLE AND EXPANSIBLE CORRUGATED WALLS.
APPLICATION FILED APR. 11, 1907.

962,951.  Patented June 28, 1910.

Witnesses
Ruth C. Fitzhugh.
Gustave N. Thompson.

Inventor
Weston M. Fulton,
By Mauro, Cameron, Lewis & Massie
Attorneys

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

METHOD OF MAKING COLLAPSIBLE AND EXPANSIBLE CORRUGATED WALLS.

962,951.   Specification of Letters Patent.   Patented June 28, 1910.

Application filed April 11, 1907. Serial No. 367,667.

*To all whom it may concern:*

Be it known that I, WESTON M. FULTON, of Knoxville, Tennessee, have invented a new and useful Improvement in Methods of Making Collapsible and Expansible Corrugated Walls, which invention is fully set forth in the following specification.

This invention relates to improvements in flexible corrugated metal walls for collapsible and expansible vessels and to methods of making the same.

The invention has for its primary object to provide a collapsible and expansible metal wall having corrugations of such a character that they will prevent the wall from collapsing to the point of taking a permanent set or from passing the elastic limit of the metal of which the corrugations are made.

A further object is the production of a wall of great durability and efficiency, which shall be compact while performing its functions in an efficient manner, and which shall effect a saving of material entering into its construction.

Flexible corrugated walls find one of their principal uses in the construction of collapsible and expansible vessels which serve as the thermosensitive elements of automatic regulators for controlling valves. It is essential for exact regulation that the thermosensitive vessel be responsive to slight changes of temperature, such as a variation of even a fraction of a degree. In practice the corrugated walls of the vessel continually collapse and expand and when they collapse the corrugations are very apt to be bent to such an extent that the bends of the corrugations take a permanent set, due to the fact that the limit of elasticity of the metal in the bends has been exceeded. When the wall of the flexible thermosensitive vessel takes on such a set the vessel will no longer operate through the same distance for the same rise of temperature, but will require a greater rise than that for which the vessel was originally set. The corrugations will not return to their normal position by the force of elasticity of the metal alone, as they should, but require the assistance of vapor expansion within the vessel. This in turn requires a higher outside temperature to operate the thermosensitive vessel, and seriously affects the sensitiveness of the regulator. It is therefore essential for the most successful operation of the thermosensitive vessel that the corrugations be able to regain their normal position after removal of the collapsing force or, in other words, should be protected from passing the elastic limit of the material of which they are made.

To overcome the above objections and to secure the benefits of my invention, I have provided a flexible corrugated tubular metal wall for collapsible and expansible vessels which when collapsed to the point where the corrugations come into contact with each other will return to their normal position by virtue of their own elasticity when the collapsing force is withdrawn, and I have also devised a method of making such wall as hereinafter fully set forth in the detailed description.

In order that the invention may be more readily understood, reference is made to the accompanying drawings which are designed merely as illustrations to assist in the description of the invention, and not as defining the limits thereof.

Figure 2:
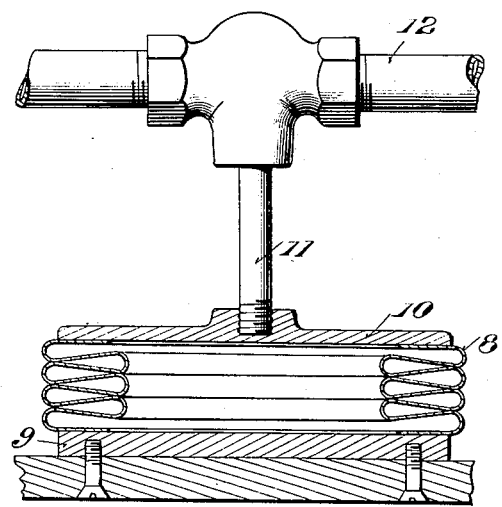
Figure 3:
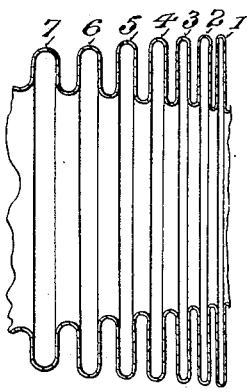

Figure 1 is a view partly in vertical section and partly in elevation, showing a collapsible wall made according to my invention and in normal position; Fig. 2 is a similar view to that shown in Fig. 1 but showing the corrugations in contact; Fig. 3 is a longitudinal sectional view of a trial wall.

The width of the corrugations required in any particular case in order to arrest the collapse of the wall before the latter reaches its elastic limit will depend upon the kind of metal used in making the wall, upon the depth of the corrugations, the thickness of the metal and the diameter of the wall or its radius of curvature. In order to determine this width in a given case I first prepare a trial wall such as is illustrated in Fig. 3 from the material which is to enter into the construction of the collapsible vessel. Having settled on the diameter of the vessel and thickness of metal wall, I make a tube of the metal to be employed and form a series of broad shallow corrugations therein, some of which I narrow and deepen more than others, but preferably form a series of deepened corrugations 1, 2, 3, 4, 5, 6, 7, of gradually varying depths. These corrugations may be made by rolling, spinning or impressing the corrugations by any desired means, though I prefer to make them by the means described in my application Sr.

No. 366,207, filed April 3, 1907. I next apply an end pressure upon this wall sufficient to cause corrugation 1 to contact with corrugation 2 and then release the pressure and allow the wall to expand by its own elasticity. If it expands back to its original position I again apply an end pressure upon the wall, but this time I make the pressure great enough to cause corrugations 1 and 2 to contact and also the corrugation 2 to contact with corrugation 3, and then release the pressure and allow the wall to freely expand. If it returns to its original position, I repeat the operation with corrugations 3 and 4, and so on until the wall will not return by its own elasticity to its original position. By having the width of successive corrugations differ from each other by very small amounts, I am thus enabled to locate the elastic limit of the metal quite accurately. Having thus determined the width of a corrugation which exceeds the elastic limit of the metal I select a narrower corrugation as the standard width, being always careful to provide a reasonable "factor of safety" by selecting as a standard a corrugation whose width is somewhat less than the one indicating the elastic limit of the metal. After thus determining the particular corrugations best suited for arresting the collapse of the wall before the latter reaches its elastic limit, I next make a metal tube—substantially of the dimensions used in making the trial wall—and form therein corrugations of a width and of the character indicated by the trial wall as being within the elastic limit of the wall. I may employ any suitable means for making these corrugations, yet I prefer to make them by the means described in my application Sr. No. 366,207, above referred to. According to the method therein described I form broad shallow corrugations in the tube wall and then narrow and deepen these corrugations step by step until they have the dimensions previously determined by the trial wall, whereby the corrugations will arrest the collapse of the wall before the latter reaches its elastic limit.

In Fig. 1 I have shown a collapsible and expansible vessel 8 serving as the thermosensitive part of an automatic valve-controlling device, the walls of which are provided with corrugations having the capability of arresting the collapse of the vessel before the elastic limit of the wall is reached. The collapsible wall 8 is provided with rigid end walls 9, 10, the latter of which is free to move up and down, due to the fluctuations of fluid pressure within the vessel caused by variations in temperature of the medium surrounding it. The upper wall is here shown engaging a valve stem 11 for operating a valve, for example in a steam pipe 12. The corrugations at the instant here illustrated are in their normal position. If now the temperature surrounding the vessel drops the fluid within the vessel contracts and the bends of the corrugations approach each other until they contact and then the downward movement ceases. This condition is shown in Fig. 2. Owing, however, to the construction of these corrugations in accordance with the principles of my invention as above explained, there is no danger that the wall will take a permanent set. When the collapsing force is removed the corrugations will return by reason of their elasticity to their normal position. Were the corrugations wider than those determined by the trial wall such, for instance, as the corrugations 6, 7, Fig. 3, the collapsing force continuing to act on the wall would close the bends into positions from which they could not completely recover their original normal positions by the force of elasticity alone because the metal in the corrugations had passed its elastic limit. The next rise of temperature in the surrounding medium will expand the vessel but when the pressure within the vessel equals that on the outside the upper wall of the vessel and consequently the valve stem will not regain its original position corresponding to the temperature for which the thermosensitive vessel was set. A higher outside temperature will be required since additional expansive force of the fluid in the vessel is necessary to overcome the set taken by the corrugations. Both sensitiveness and accuracy are thereby sacrificed by permitting the wall to pass its elastic limit. These objections are overcome by making the corrugations in accordance with my invention. The bends contact before the elastic limit of the material is reached. The quantity of metal in the bends is also reduced by my method, thereby effecting economy in the construction of the vessels, a matter of considerable commercial importance because only the higher grades of brass and steel are capable of giving a high degree of elasticity—an essential feature in these vessels. My method also enables a reduction in the amount of wall surface exposed to the pressure of fluid confined by the wall without reducing the strength of the wall to a proportionate degree, and thus renders the wall more capable of withstanding this pressure, and it further reduces the amount of space occupied by the wall without reducing its range of collapsibility and expansibility.

I consider as within the scope of my invention the production of metallic corrugations which have the capability when collapsed to the point where the corrugations come into contact with each other of returning to their normal position by virtue of their own elasticity when the collapsing force is withdrawn.

I prefer that the corrugations should lie in planes perpendicular to the axis of the tube, but they may be formed on an ascending spiral similar to the threads of a screw without departing from my invention.

What is claimed is:

The process of making tubular corrugated walls for collapsible and expansible vessels, which consists in circumferentially corrugating the walls of the vessel and so proportioning the depth and width of the corrugations relative to each other and to the metal itself, that the walls of the corrugations will contact within the elasticity of the metal.

In testimony whereof I have signed this specification in the presence of two subscribing witnesses.

WESTON M. FULTON.

Witnesses:
E. J. S. HYATT,
E. T. MANNING.